United States Patent
Miller et al.

(10) Patent No.: US 7,058,860 B2
(45) Date of Patent: Jun. 6, 2006

(54) SYSTEM AND METHOD OF AUTOMATIC PARAMETER COLLECTION AND PROBLEM SOLUTION GENERATION FOR COMPUTER STORAGE DEVICES

(75) Inventors: Jennifer J. Miller, Greeley, CO (US); Alex Lenart, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 642 days.

(21) Appl. No.: 09/896,495

(22) Filed: Jun. 29, 2001

(65) Prior Publication Data
US 2003/0005362 A1    Jan. 2, 2003

(51) Int. Cl.
*G06F 11/00* (2006.01)
(52) U.S. Cl. ............... 714/47; 714/48; 714/57
(58) Field of Classification Search ............ 714/47, 714/48, 49, 57, 39, 26
See application file for complete search history.

(56) References Cited

U.S. PATENT DOCUMENTS

| | | | | |
|---|---|---|---|---|
| 4,695,946 A | * | 9/1987 | Andreasen et al. | 714/31 |
| 5,708,775 A | * | 1/1998 | Nakamura | 714/48 |
| 6,014,658 A | * | 1/2000 | Pretz | 707/2 |
| 6,243,838 B1 | * | 6/2001 | Liu et al. | 714/57 |
| 6,343,236 B1 | * | 1/2002 | Gibson et al. | 700/79 |
| 6,633,876 B1 | * | 10/2003 | Heatlie | 707/10 |
| 6,654,915 B1 | * | 11/2003 | Lu et al. | 714/57 |
| 6,665,824 B1 | * | 12/2003 | Ruhlen et al. | 714/57 |
| 6,691,064 B1 | * | 2/2004 | Vroman | 702/183 |
| 6,718,489 B1 | * | 4/2004 | Lee et al. | 714/43 |
| 6,742,141 B1 | * | 5/2004 | Miller | 714/26 |
| 2002/0138315 A1 | * | 9/2002 | Nozaki et al. | 705/7 |

OTHER PUBLICATIONS

XML; whatis.com encyclopedia; Jan. 10, 2001; http://web.archive.org/web/20010331103057/whatis.techtarget.com/Whatis_Definition_Page/0,4152,213404,00.html.*

* cited by examiner

*Primary Examiner*—Scott Baderman
*Assistant Examiner*—Joshua Lohn

(57) ABSTRACT

The present invention includes a system for and a method of a support system which includes an information manager to gather performance information and error condition-related information from a computer product which is sent by the information manager electronically to a support server. The support server, working with an associated database, attempts to solve the underlying error present in the computer product by analyzing the information received, comparing the information to a database containing previously reported error related information and identification of a proposed solution or corrective action from the database. This proposed solution, or corrective action is then sent to the information manager.

25 Claims, 2 Drawing Sheets

SYSTEM AND METHOD OF AUTOMATIC PARAMETER COLLECTION AND PROBLEM SOLUTION GENERATION FOR COMPUTER STORAGE DEVICES

TECHNICAL FIELD

The invention relates to the resolution of error conditions in computer storage systems and more specifically, to the automated collection of information to identify a problem and solution generation for computer storage devices.

BACKGROUND

Typically, manufacturers of computer systems, computer devices, computer components or software (computer products) offer customers technical support once the computer products have been purchased or leased by the consumer. This support may consist of technical information on the use of the computer products or may be directed to the identification and solution of problems encountered when using the computer products. Typically, when a customer encounters a problem with a computer product, he or she calls the manufacturer's support center, who in turn generates an incident number, and then requests that the consumer manually gather data from the malfunctioning computer product. This data is then formatted into an electronic mail, or e-mail, message or described verbally and sent or communicated to the service center of the manufacturer. After allowing time for the service center to receive this information, the customer calls the service center where technical personnel access the data contained in the e-mail or verbal message and, working with the customer, attempt to identify the malfunction (or the misuse) of the computer product. Once the problem is identified, the service center personnel instructs the customer on the steps required to correct the problem. If, however, the service center personnel cannot identify and/or solve the malfunction, a service technician is dispatched to the site or the consumer is asked to bring the computer product in for repair.

The process in identifying and solving malfunctions in computer products is manually intensive, time consuming, and inefficient. Additionally, each service center personnel must be trained in the identification and solutions for malfunctions which may appear in the supported computer products. This process is again inefficient as support personnel turnover requires retraining and additional education. Additional inefficiencies occur when trained service personnel spend time and expend resources in solving known problems or when particularly complicated or difficult problems are resolved by different personnel at a later time for a different customer.

SUMMARY OF THE INVENTION

The present invention is directed to a method of and apparatus for a support system which comprises a storage device including an information manager configured to collect performance information and to generate an error message including the performance data. Also included is a support server which receives the error message and, working with the information in an associated database, identifies malfunctions and proposes solutions.

DETAILED DESCRIPTION

Figure 1:
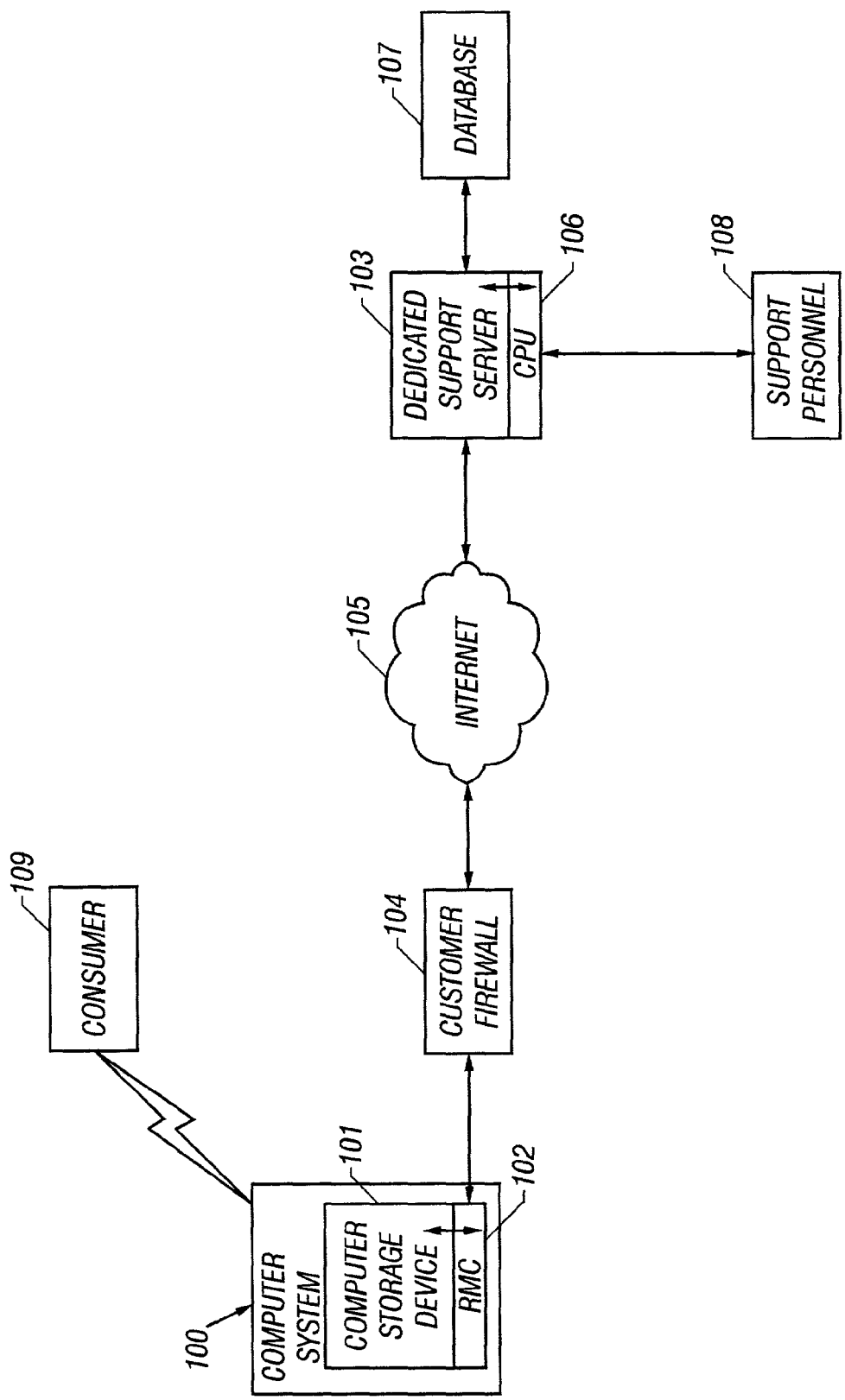
FIG. 1 is a block diagram of a system which automatically gathers error information and suggests solutions for the error condition according to the present invention.

FIG. 1 is a block diagram of a system that may be used pursuant to the present invention to automatically gather parameter information from a malfunctioning storage device indicative of symptoms of a fault. The information is then transmitted to a dedicated support server that may include a central processing unit and a connection to a database which, working together, are programmed to identify malfunctions and propose solutions to correct the malfunctions of the storage device. Specifically, for example, consumer 109 purchases computer storage device 101, such as a tape library, from a manufacturer and installs storage device 101 into the consumer's system 100. Included within storage device 101 is an information manager such as a Remote Management Card (RMC) 102 that collects and packages information used to troubleshoot the malfunction within computer product 101 for analysis and tracking by dedicated support server 103. This information may be performance data or error information or combined performance and error information. RMC 102 gathers the relevant information, the information is embedded in a performance or error message and the message, including that information is sent to dedicated support server 103 through consumer firewall 104 (if present) via Internet 105. The performance or error information collected may be error-condition related information. "Pushing" this information through firewall 104 allows the information to be received by dedicated support server 103 which could not otherwise initiate access of the information. This communication may be transmitted using HTTP or other protocol and/or format. Consumer firewall 104, if present, allows RMC 102 to push data out from the consumer's Local Area Network (LAN) (not shown) or other local communications environment to Internet 105. Once RMC 102 data is received by dedicated support server 103, embedded Central Processing Unit (CPU) 106 executes resident software to analyze the data contained in RMC 102 message. In analyzing this data, CPU 106 may access database 107 to compare RMC 102 data to pre-existing records or trends.

If dedicated support server 103 cannot identify or solve the malfunction, RMC 102 data may be sent to support personnel 108 for follow-on analysis. Alternatively, if dedicated support server 103 can identify the problem and identify a proposed solution, an appropriate message may be sent from dedicated support server 103 to RMC 102 or to consumer 109 with the suggested corrective action.

Additionally, database 107 collects, stores and processes data gathered by RMC 102 and performs comparisons between this data and other data generated by, and collected from similar storage devices. This information is used to create a database of information about storage devices, their characteristics, maintenance issues, error conditions, malfunctions, solutions, and early indications that would be helpful in future trouble-shooting.

Preferably, the report page generated by RMC 102 would be written in Extensible Markup Language (XML) which would allow CPU 106 to easily parse the data for processing and storage in database 107. Alternatively, other mark-up languages and formats may be used or formats that can be converted into a user-friendly form can also be used without deviating from the spirit of this invention. The XML-based report page may be communicated using Hypertext Transfer Protocol (HTTP) as the transport mechanism.

If repair information containing corrective or proposed solutions is sent from CPU 106 to RMC 102 this information may be sent via an e-mail to gain access through consumer firewall 104, or may be in response to RMC 102 generated poll to CPU 106.

Figure 2:
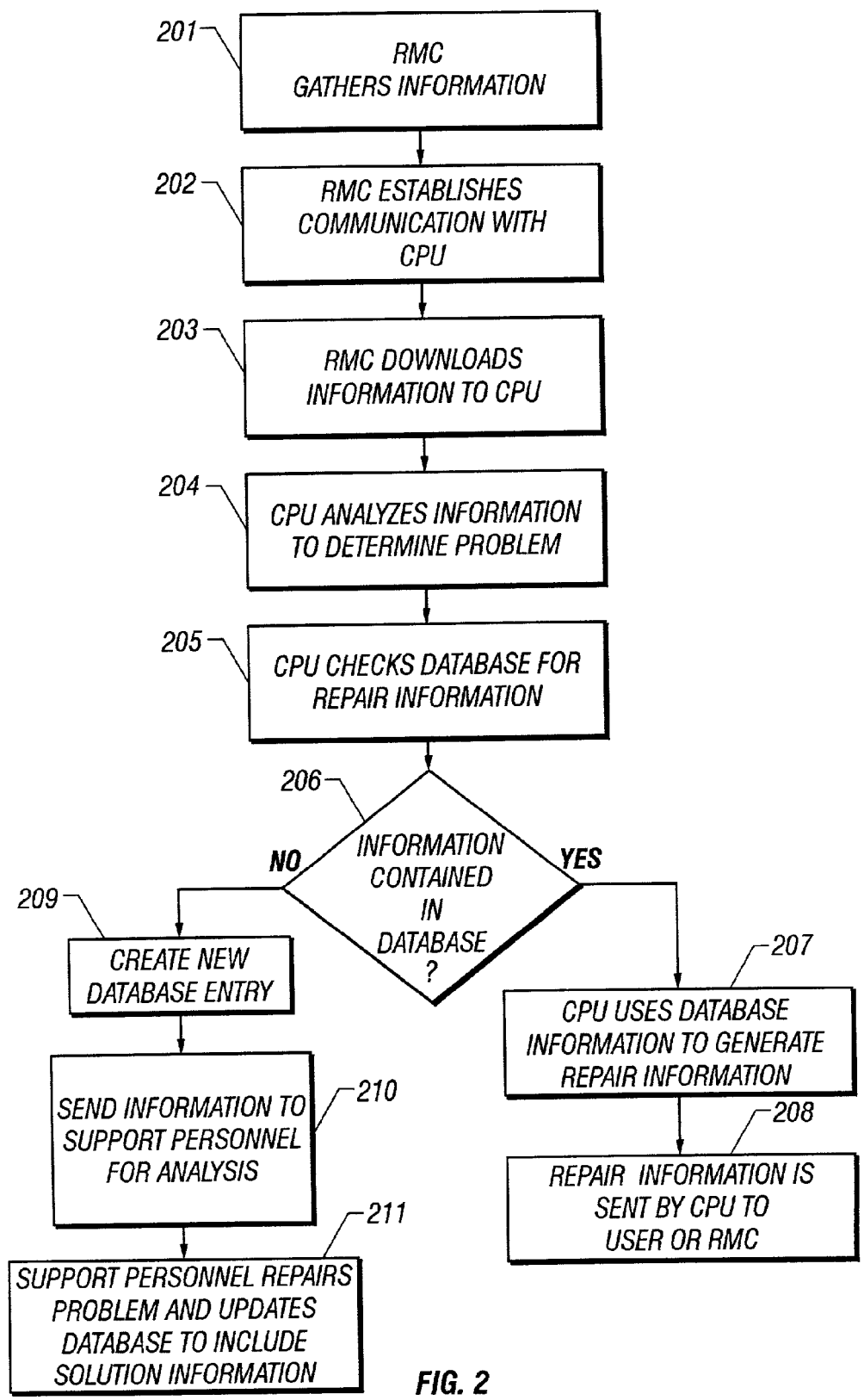
FIG. 2 is a flow chart which depicts an overall process of an embodiment of the present invention.

FIG. 2 shows a flow chart which outlines an overall process of an embodiment of the invention. In step 201, the user of the storage device determines that the storage device is malfunctioning. The user requests that RMC 102 gather relevant information (from sensors or internal logs) and send that information to dedicated support server 103 (FIG. 1). In step 202, RMC 102 establishes communication with CPU 106, through dedicated support server 103, and downloads the information to CPU 106 in step 203. In step 204, CPU 106 analyzes the information and preferably accesses the database (step 205) to identify the malfunction and, if possible, a solution. At step 206, if information relevant to the identified malfunction is contained in the database, CPU 106 uses the information to determine a course of action (step 207), and sends this information to the user or RMC 102 (FIG. 1) for implementation (step 208). The information collected may be performance data, error messages or information, or any other data pertinent to the operation of the storage device Alternatively, if at step 206 information relevant to identified malfunction is not contained in the database, in step 209 a new database entry is created in which to store this error information. Because CPU 106 cannot suggest a solution, the problem is referred to support personnel in step 210 for resolution. In step 211 the support personnel identify a solution and import information relevant to the solution into the database. The support personnel would preferably also follow up with the customer to ensure the problem with the storage device was correctly resolved.

If a problem is experienced by the tape library, for instance an updated release of the software or firmware stored within the tape library is interrupted during loading causing the tape library to remain in boot-up, the RMC may preferably be used to collect corresponding information when enabled by the user. In this example, the corresponding information may include software or firmware version number, the date the software or firmware was loaded, the size of the corresponding file, etc. The collected information would be sent to the support server, which upon analysis of the problem would identify the failed software or firmware update and accordingly would instruct the operator to reload the information. In this example, the problem may be identified from a variation in size between the expected software or firmware loaded and the actual size of the file. Similarly, partial availabilities of tape libraries, or other problems, may be identified by the support server by analysis of information collected by the RMC.

In another embodiment, the present invention includes an automatic recognition capability that determines the presence of an error condition and begins collecting error-related information as a result of this detection. Such automatic detection mechanisms are known in the art and this embodiment of the present invention includes these as the impetus to start information collection. For example, Hewlett-Packard manufactures a C7200 tape library that is currently shipped with a Remote Management Card (RMC) installed. The RMC card allows access of the purchasing company's local network's tape library to gather information from sensors located within the tape library.

What is claimed is:

1. A support system comprising:
    an information manager within a storage device configured to collect performance information and embed said performance information of said storage device into an error message;
    a support server configured to receive said error message from said information manager and analyze said performance information; and
    a database configured to maintain a history of previous performance information and at least one corresponding corrective solution wherein:
        said support server bypasses support personnel and communicates a proposed solution to said information manager if said proposed solution can be identified from said database; otherwise
        said support server sends a message to support personnel if said solution can not be identified from said database.

2. The support system of claim 1 wherein said information manager is a remote management card within said storage device.

3. The support system of claim 1 wherein said error message is written in Extensible Markup Language.

4. The support system of claim 1 wherein said support server receives said error message via the Internet.

5. The support system of claim 1 wherein said support server is configured to search said database to identify matching performance information and send said solution associated to said performance information to said information manager as said proposed solution.

6. The support system of claim 1 further comprising:
    a database update logic configured to update said performance information and said at least one solution in said database to include performance information received from said information manager and corresponding said at least one solution.

7. A method of identifying proposed solutions to correct an error condition within a storage device, said method comprising the steps of:
    gathering error condition-related information of said storage device;
    embedding said error condition-related information into an electronic message; transmitting said electronic message to a remote support server; and
    identifying as a proposed solution:
        one of a set of known solutions, if said error condition-related information can be matched to an error condition linked to said one of said set of known solutions; and
        a solution created by a support technician after being forwarded said error condition-related information, if said match cannot be made; and
    wherein said gathering, said embedding, and said transmitting are performed within said storage device.

8. The method of claim 7 wherein the step of gathering error condition-related information further comprises at least one of the group of:
    sensing parameters of said storage device and reading information from an internal log.

9. The method of claim 7 wherein the step of embedding said error condition-related information further comprises formatting said information in an Extensible Markup Language.

10. The method of claim 7 wherein said step of communication further comprises transmitting said electronic message on the Internet.

11. The method of claim 10 wherein said method further comprises the step of:
communicating identified proposed solutions from said remote server via said Internet to said storage device.

12. The method of claim 7 wherein said step of identifying a proposed solution to said error further comprises a step of comparing said error condition-related information to error information contained in a database.

13. The method of claim 7 further comprising a step of:
communicating said proposed solution to a remote management card in said storage device that exhibits an error corresponding to said error condition-related information.

14. The method of claim 13 wherein said step of communicating further comprises transmission of an electronic message to said remote management card.

15. The method of claim 13 wherein said step of communicating further comprises providing an electronic message to a user of said computer product.

16. A method of automatically identifying a possible solution for an error condition comprising the steps of:
automatically recognizing, without manual intervention, an error condition within a computer storage device;
gathering error condition-related information;
embedding said error condition-related information into an electronic message; communicating said electronic message to a support server remote from said computer storage device;
comparing said error condition-related information to a set of known error conditions;
if said error condition-related information does not match one of said known error conditions, identifying as said possible solution associated with said matched known error condition; and
if said error condition-related information does not match one of said known error conditions, forwarding said error condition-related information to a support technician, wherein said support technician identifies said possible solution; and
wherein said recognizing, said gathering, said embedding, and said communicating are performed within said storage device.

17. The method of claim 16 wherein said step of automatically recognizing an error condition further comprises sensing parameters with said computer storage device.

18. The method of claim 16 wherein the step of gathering error condition-related information further comprises performing at least one of the group of:
sensing parameters of said storage device and reading information from an internal log.

19. The method of claim 16 wherein the step of embedding said error condition-related information uses Extensible Markup Language.

20. The method of claim 16 further comprising the step of:
communicating identified ones of said proposed solutions from said remote location to said computer storage device.

21. A computer implemented method, said method comprising:
detecting an error condition in a computer storage device;
transmitting, with the computer storage device, an electronic message describing said detected error condition to a support server;
acquiring, with the computer storage device, a solution to said detected error condition using:
computer executable code for determining if a solution to said detected error condition matches one of a plurality of known error conditions stored in memory; and
computer executable code for acquiring, from a user, a solution to said detected error condition if said detected error condition does not match the known error conditions stored in memory; and
means for transmitting said acquired solution to a system utilizing said storage device.

22. The method of claim 21 wherein said support server is remote from said system utilizing said storage device, and further comprising:
means for transmitting said electronic message to said remote server across the Internet; and
means for transmitting said acquired solution to said system utilizing said storage device across the Internet.

23. The method of claim 21, further comprising:
a processor executing said code for acquiring said solution to said detected error condition.

24. Computer executable code stored on a computer readable storage medium, said code comprising:
code for accepting an electronic message from a system using an electronic storage device, wherein said electronic message comprises a description of an automatically detected error condition of a computer storage device;
code for comparing said detected error to a list of known errors and solutions to determine if said detected error matches one of said known errors, and returning a solution to said known error condition that matches said detected error condition; and
code for presenting said detected error condition to a user if none of said known error conditions matches said known condition; and
wherein a detection of the error condition, a creation of the electronic message, and a transmission of the electronic message from said system is all carried out within the storage device.

25. The code of claim 24 further comprising:
code for updating said list of known errors by adding said detected error and a solution to said known error generated by said user.

* * * * *

UNITED STATES PATENT AND TRADEMARK OFFICE
CERTIFICATE OF CORRECTION

PATENT NO. : 7,058,860 B2
APPLICATION NO. : 09/896495
DATED : June 6, 2006
INVENTOR(S) : Jennifer J. Miller et al.

It is certified that error appears in the above-identified patent and that said Letters Patent is hereby corrected as shown below:

In column 5, line 34, in Claim 16, delete "does not match" and insert -- matches --, therefor.

In column 5, line 36, in Claim 16, after "solution" insert -- a known solution --.

Signed and Sealed this

Nineteenth Day of May, 2009

JOHN DOLL
*Acting Director of the United States Patent and Trademark Office*